US008269600B2

(12) United States Patent
Floyd

(10) Patent No.: US 8,269,600 B2
(45) Date of Patent: Sep. 18, 2012

(54) METHOD AND APPARATUS FOR AUTOMATED CONTROL OF A SECURED AREA

(75) Inventor: Jon Floyd, Owlsmoor (GB)

(73) Assignee: Arinc Incorporated, Annapolis, MD (US)

( * ) Notice: Subject to any disclaimer, the term of this patent is extended or adjusted under 35 U.S.C. 154(b) by 1038 days.

(21) Appl. No.: 11/943,208

(22) Filed: Nov. 20, 2007

(65) Prior Publication Data

US 2009/0128284 A1 May 21, 2009

(51) Int. Cl.
*G05B 19/00* (2006.01)

(52) U.S. Cl. .......... 340/5.2; 340/5.3; 340/5.31; 340/5.7; 49/68; 49/93; 49/95; 49/104; 49/109; 49/113; 49/116; 49/117; 49/118; 160/113; 160/114; 160/116; 160/118; 160/199; 160/180; 160/206

(58) Field of Classification Search .................... 340/5.2
See application file for complete search history.

(56) References Cited

U.S. PATENT DOCUMENTS

| | | | | |
|---|---|---|---|---|
| 4,656,954 | A * | 4/1987 | Tonali | 109/6 |
| 5,845,692 | A * | 12/1998 | Kellem et al. | 160/118 |
| 6,484,650 | B1 * | 11/2002 | Stomski | 109/6 |
| 6,745,520 | B2 * | 6/2004 | Puskaric et al. | 52/64 |
| 6,958,676 | B1 * | 10/2005 | Morgan et al. | 340/5.72 |
| 7,135,980 | B2 * | 11/2006 | Moore et al. | 340/573.1 |
| 2003/0020607 | A1 * | 1/2003 | Risi | 340/540 |
| 2003/0095040 | A1 * | 5/2003 | Shimomura | 340/426.13 |
| 2003/0213184 | A1 * | 11/2003 | Hunt et al. | 52/36.1 |
| 2004/0240711 | A1 * | 12/2004 | Hamza et al. | 382/118 |

FOREIGN PATENT DOCUMENTS

| | | |
|---|---|---|
| CH | 669685 A5 | 2/1986 |

OTHER PUBLICATIONS

International Search Report (in connection with related PCT Application No. PCT/US2008/081314), dated Jan. 6, 2009.

* cited by examiner

*Primary Examiner* — Benjamin C Lee
*Assistant Examiner* — Curtis King
(74) *Attorney, Agent, or Firm* — Ronald E. Prass, Jr.; PRASS LLP

(57) ABSTRACT

A method and apparatus that controls access to a secured area using an automated gate controlled secured environment is disclosed. The method may include receiving an indication that an individual attempting to pass through a clearance area has not been authorized to pass through the clearance area, automatically moving one or more gates to create a channel for the non-authorized individual to be directed to a manual screening area, determining if the non-authorized individual has passed one or more sensor; wherein if the non-authorized individual has been determined to have passed the one or more sensor, then moving a gate located behind the non-authorized individual to enable other authorized individuals to pass through the clearance area while maintaining the channel created to the manual screening area, and preventing the non-authorized individual from gaining access to the automated gate controlled secured environment once the non-authorized individual reaches the manual screening area.

15 Claims, 8 Drawing Sheets

METHOD AND APPARATUS FOR AUTOMATED CONTROL OF A SECURED AREA

BACKGROUND OF THE DISCLOSURE

1. Field of the Disclosure

The disclosure relates to manage the flow of individuals passing through a screening system.

2. Introduction

Recent events dictate the need for automation of personal identification and clearance at pedestrian control points. Facilities such as: airports; train stations; secured events; secured buildings; etc. do not have the infrastructure or are not designed or built to manage the flow of individuals who attempt to gain access but are denied access at automated clearance gates. The architecture of airports prevents isolation of travelers denied access once they have passed through automated clearance gates. These conventional systems and processes also create bottlenecks and delays for other individuals attempting to gain access through the gates.

In addition, the conventional systems creates distress for individuals who must exit such a gate because they have been erroneously denied authority to enter or exit a country, event, etc. and must then work their way through a queuing area to reenter a gate. Furthermore, the opportunity to apprehend an individual wanted as a crime suspect or is subject to court-enforced travel restriction, is limited or prohibited.

SUMMARY OF THE DISCLOSURE

A method and apparatus that controls access to a secured area using an automated gate controlled secured environment is disclosed. The method may include receiving an indication that an individual attempting to pass through a clearance area has not been authorized to pass through the clearance area, automatically moving one or more gates to create a channel for the non-authorized individual to be directed to a manual screening area, determining if the non-authorized individual has passed one or more sensor; wherein if the non-authorized individual has been determined to have passed the one or more sensor, then moving a gate located behind the non-authorized individual to enable other authorized individuals to pass through the clearance area while maintaining the channel created to the manual screening area, and preventing the non-authorized individual from gaining access to the automated gate controlled secured environment once the non-authorized individual reaches the manual screening area.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION OF THE DISCLOSURE

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosure comprises a variety of embodiments, such as a method and apparatus and other embodiments that relate to the basic concepts of the disclosure. This disclosure may concern an in-line multi-gate system for secured events, travel, buildings, etc. with motion sensors to close open and close off the common area to un-authorized individuals. For example, the one of the possible embodiments may close the second gate until an un-authorized individual has been channeled to the manual screening control desks.

The among the many advantages of the method and system of the disclosure may be:

- un-authorized individuals may use a normal $2^{nd}$ exit gate from the automated clearance systems and do not have to turn round to exit the system;
- un-authorized individuals are contained within a secure area between the manual immigration desk and the automated clearance gates;
- clearance control agents are not required to attend the automated clearance gate to retrieve un-authorized passengers;
- un-authorized individuals are not required to turnaround and exit via the entry gate; and
- disruption to authorized individuals is minimized.

Figure 1:
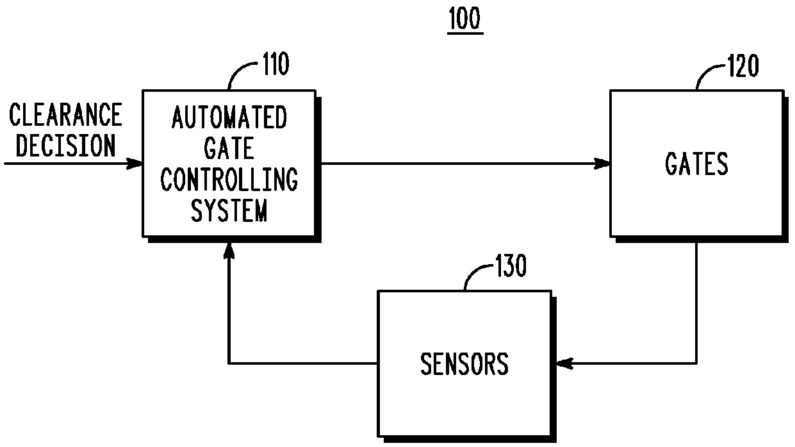
FIG. 1 illustrates an exemplary diagram of automated gate controlled secured environment in accordance with a possible embodiment of the disclosure.

FIG. 1 illustrates an exemplary diagram of automated gate controlled secured environment 100 in accordance with a possible embodiment of the disclosure. In particular, the automated gate controlled secured environment 100 may include an automated gate controlling system 110, gates 120, and sensors 130. The automated gate controlling system 110 may represent any computer, server, controller, etc. that may automatically control access individuals to particular areas. The automated gate controlling system 110 will be discussed further below in relation to FIGS. 2-9.

Gates 120 may represent any type of physical, mechanical, electrical, or virtual gate, door, restraint, boarder, partition, etc. and may be made of any possible material or electric field know to those of skill in the art that may provide the function of restricting access in any particular direction. The gates 120 may be made move in any direction and thus, may be swinging, sliding, vertically lifting or receding, etc.

Sensors 130 may represent any sensor that may sense an individual's presence and/or movement. Other sensors 130 may sense the position and/or status of gates 120 (i.e., open, closed, left, right, up, down, partially open, malfunctioning, etc.). In this manner, the automated gate controlling system 110 may control the gates 120 based on input and/or clearance decision from an automated or manual clearance system, the status of the gates 120, and the signals from the sensors 130.

The automated gate controlled secured environment 100 may be used to gain access to any secured area or area which security has been determined to be important, such as an event, a building, a concert, a political event, a sporting event, an amusement park, an airport, a train station, public area, a country boarder area, a passport clearance area, a travel arrival area, or a travel departure area, for example.

Figure 2:
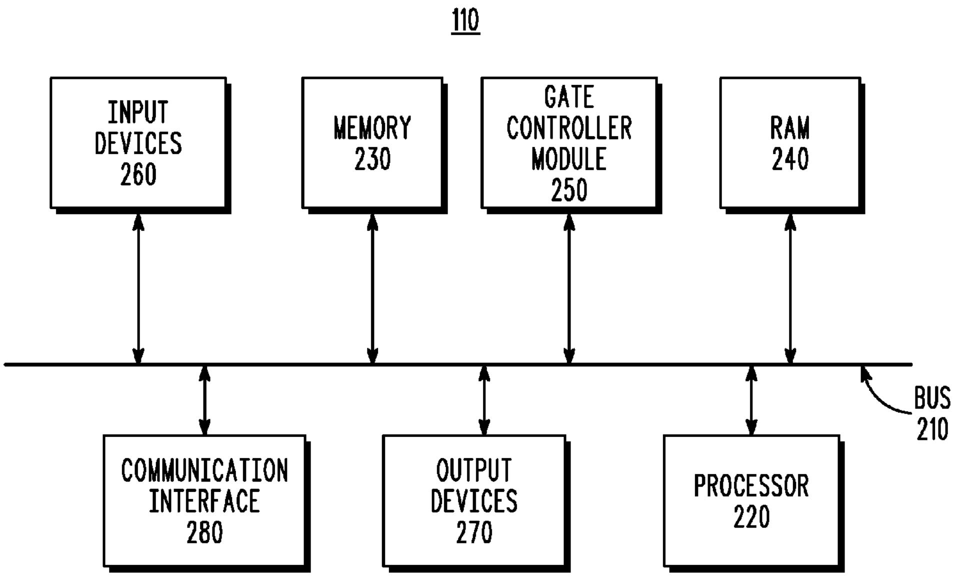
FIG. 2 illustrates a block diagram of an exemplary automated gate controller system in accordance with a possible embodiment of the disclosure.

FIG. 2 illustrates a block diagram of an exemplary automated gate controller system 110 in accordance with a possible embodiment of the disclosure. The exemplary automated gate controller system 110 may include bus 210, processor 220, memory 230, read only memory (ROM) 240, gate controller module 250, input devices 260, output devices 270, and communication interface 280. Bus 210 may permit communication among the components of the automated gate controller system 110.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Memory 230 may also represent any storage device that may include any type of media, such as, for example, magnetic or optical recording media and its corresponding drive.

Input devices 260 may include one or more conventional mechanisms that permit a user to input information to the automated gate controller system 110, such as a keyboard, a mouse, a pen, a voice recognition device, etc. Output devices 270 may include one or more conventional mechanisms that output information to the user, including a display, a printer, one or more speakers, or a medium, such as a memory, or a magnetic or optical disk and a corresponding disk drive.

Communication interface 280 may include any transceiver-like mechanism that enables the automated gate controller system 110 to communicate via a network. For example, communication interface 280 may include a modem, or an Ethernet interface for communicating via a local area network (LAN). Alternatively, communication interface 280 may include other mechanisms for communicating with other devices and/or systems via wired, wireless or optical connections. In some implementations of the automated gate controller system 110, communication interface 280 may not be included in the exemplary automated gate controller system 110 when the automated gate controlling process is implemented completely within the automated gate controller system 110.

The automated gate controller system 110 may perform such functions in response to processor 220 by executing sequences of instructions contained in a computer-readable medium, such as, for example, memory 230, a magnetic disk, or an optical disk. Such instructions may be read into memory 230 from another computer-readable medium, such as storage device 250, or from a separate device via communication interface 280.

The automated gate controlled secured environment 100 and the automated gate controller system 110 illustrated in FIGS. 1 and 2 and the related discussion are intended to provide a brief, general description of a suitable computing environment in which the disclosure may be implemented. Although not required, the disclosure will be described, at least in part, in the general context of computer-executable instructions, such as program modules, being executed by the automated gate controller system 110, such as a general purpose computer. Generally, program modules include routine programs, objects, components, data structures, etc. that perform particular tasks or implement particular abstract data types. Moreover, those skilled in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

For illustrative purposes, the operation of the gate controller module 250 and the automated gate controlling process will be described below in relation to the block diagrams shown in FIGS. 1-2.

Figure 3:
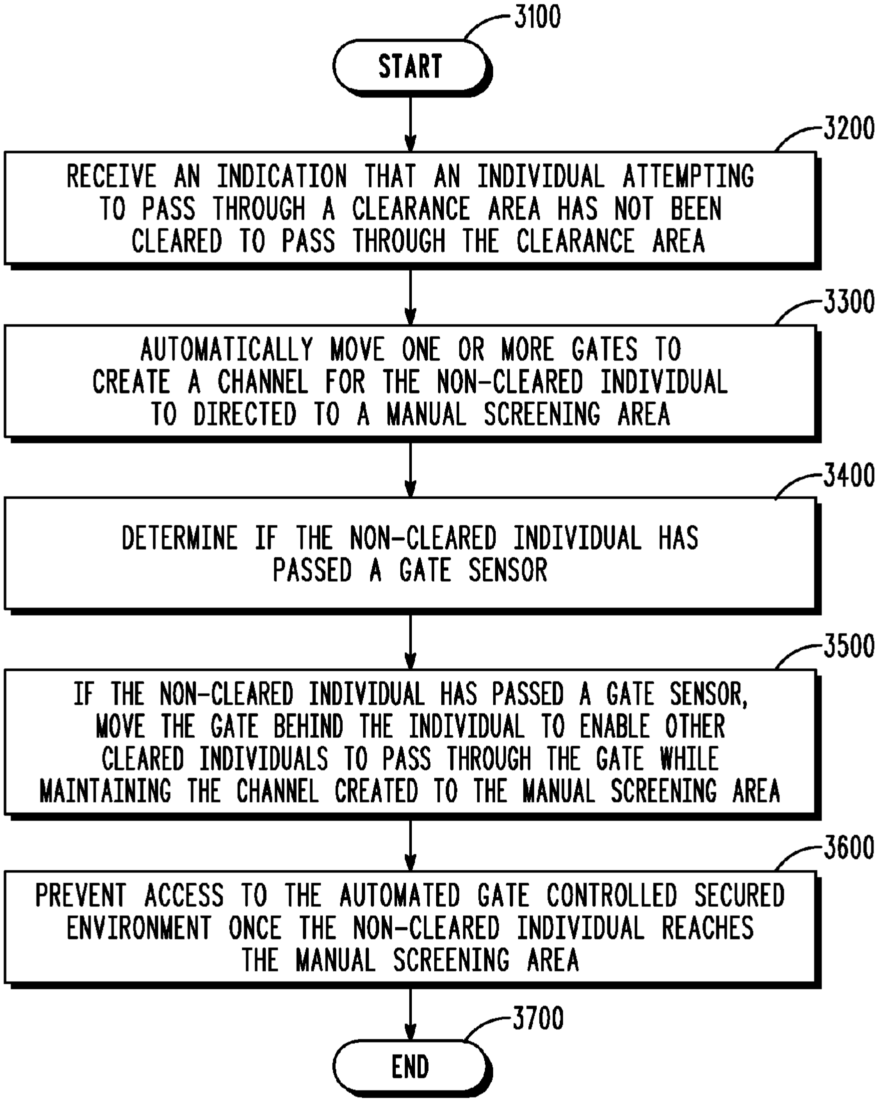
FIG. 3 illustrates an exemplary flowchart illustrating one possible automated gate controlling process in accordance with one possible embodiment of the disclosure.

FIG. 3 is an exemplary flowchart illustrating some of the basic steps associated with an automated gate controlling process in accordance with a possible embodiment of the disclosure. The process begins at step 3100 and continues to step 3200 where the gate controller module 250 may receive an indication that an individual attempting to pass through a clearance area has not been authorized to pass through.

At step 3300, the gate controller module 250 may automatically move one or more gates 120 to create a path or channel for the non-authorized individual to be directed to a manual screening area. At step 3400, the gate controller module 250 may determine if the non-authorized individual has passed or has been sensed by one or more sensor 130. If the gate controller module 250 determines that the non-authorized individual has passed or has been sensed by one or more sensor 130, then at step 3500, the gate controller module 250 may move the gate 120 behind the individual to enable other authorized individuals to pass through the gate 120 while maintaining the channel created to the manual screening area.

At step 3600, the gate controller module 250 may prevent access of the non-authorized individual to the automated gate controlled secured environment once the non-authorized individual reaches the manual screening area. The process goes to step 3700 and ends.

FIGS. 4-9 illustrate an example of the automated gate controlling process in accordance with a possible embodiment of the disclosure. In this example, normal operation the gates are inline with the containment system. Thus, individuals may enter and flow through as they are permitted access.

Figure 4:
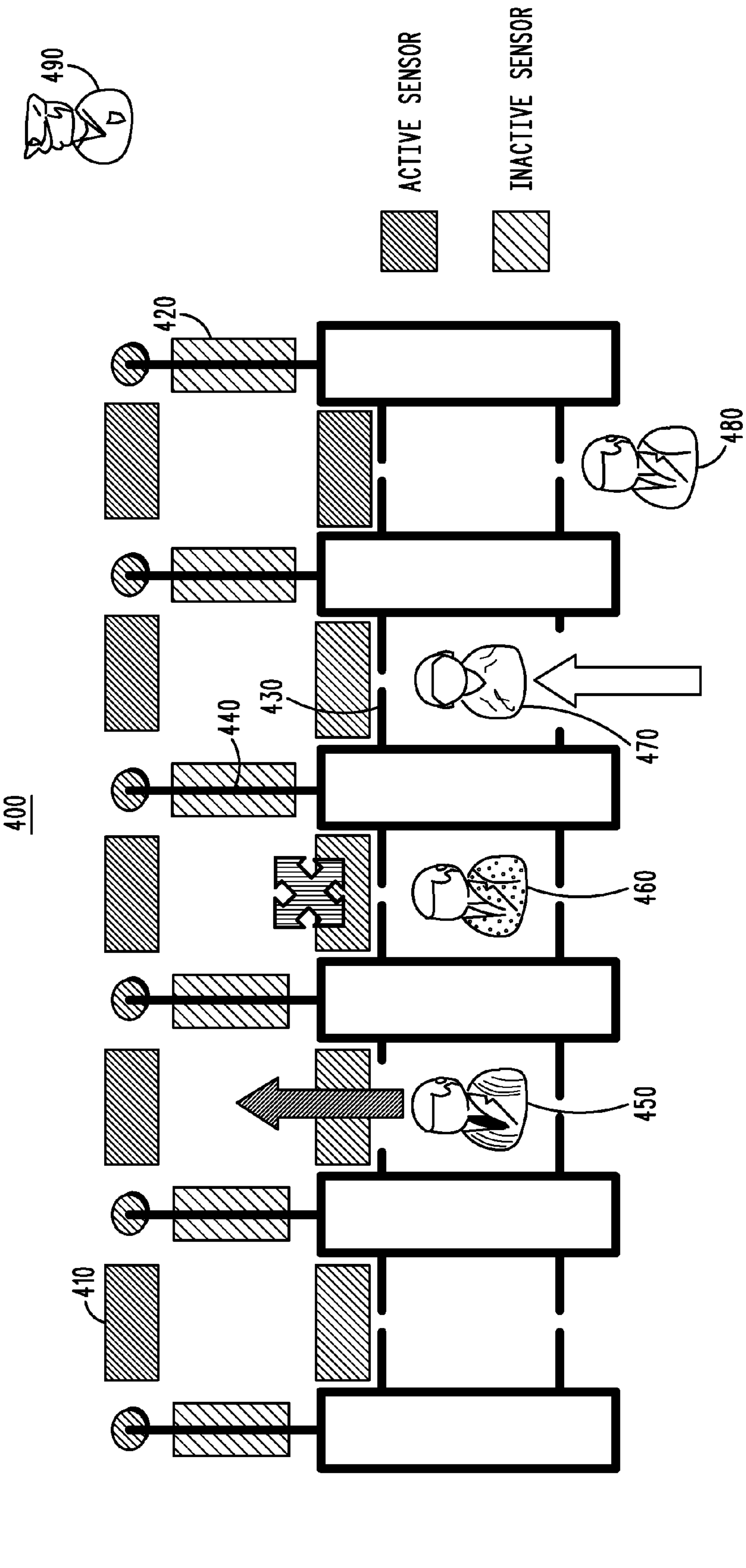
FIGS. 4-9 illustrate an example of the automated gate controlling process in accordance with a possible embodiment of the disclosure.

In the example scenario beginning with FIG. 4, individuals 450, 460, 470 and 480 are attempting to gain access through the automated gate controlled secured environment 400. The automated gate controlled secured environment 400 may include a plurality of sensors 410, 420 located along directions 90° apart, sliding gates 430, and swinging gates 440.

In FIG. 4, a clearing area exists between sliding gates 430. In the clearing area, a clearing decision is made to allow the individual to enter the secured area beyond or to deny access and send the individual to a manual screening area for further screening, questioning, etc.

In this first frame, individual 450 is in the clearing area but has been authorized and sliding gates 430 open to allow his passage. Individual 480 is shown to be awaiting entry the clearing area. Sliding gates 430 are shown to be open to allow individual 470 into the clearing area. Sliding gates 430 at the other end of the clearing area remain closed. Once an individual enters the clearing area, the sliding gate 430 behind the individual will close.

For example, individual 460 is in the clearance area awaiting a clearance decision. As shown by the "X", the clearance decision sent to the automated gate controlling system 110 indicates that individual 460 has been denied access and must be sent to the manual screening area to screening control officer 490.

Figure 5:
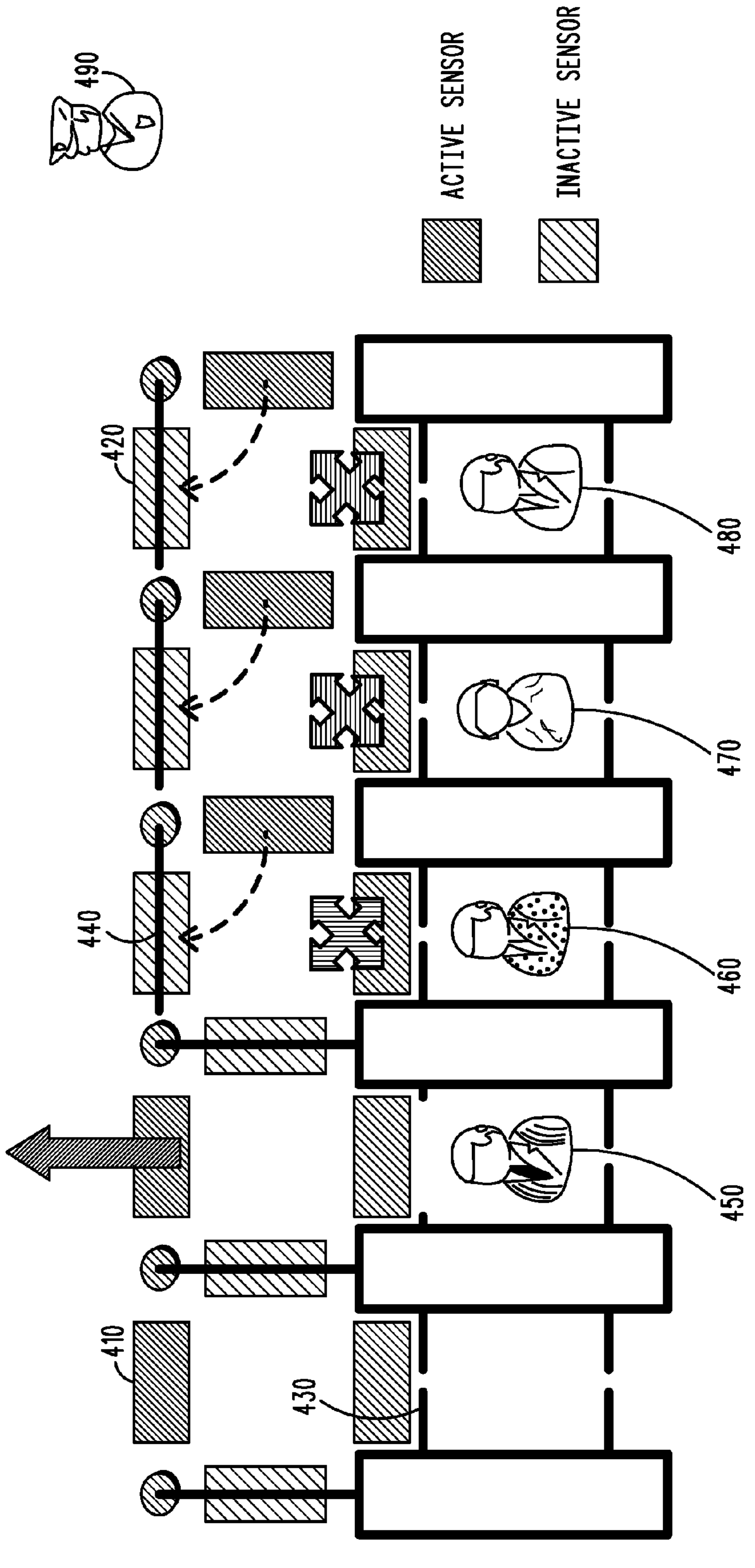

As shown in FIG. 5, since individual 460 has been selected for manual screening inspection, swinging gates 440 to the right of the containment gate where that individual is held swing clockwise 90 thus turning to form a barrier and creating a channel which will lead the individual 460 towards screening control officer 490. Sensors 420 are activated to monitor the individual's 460 flow along the channel.

Note that the screening control officer 490 may be also be located to the left in which case the swinging gate 440 will rotate counter-clockwise. If there is a centrally located agent, for example, swinging gates 440 on the left and right with rotate appropriately.

Figure 6:
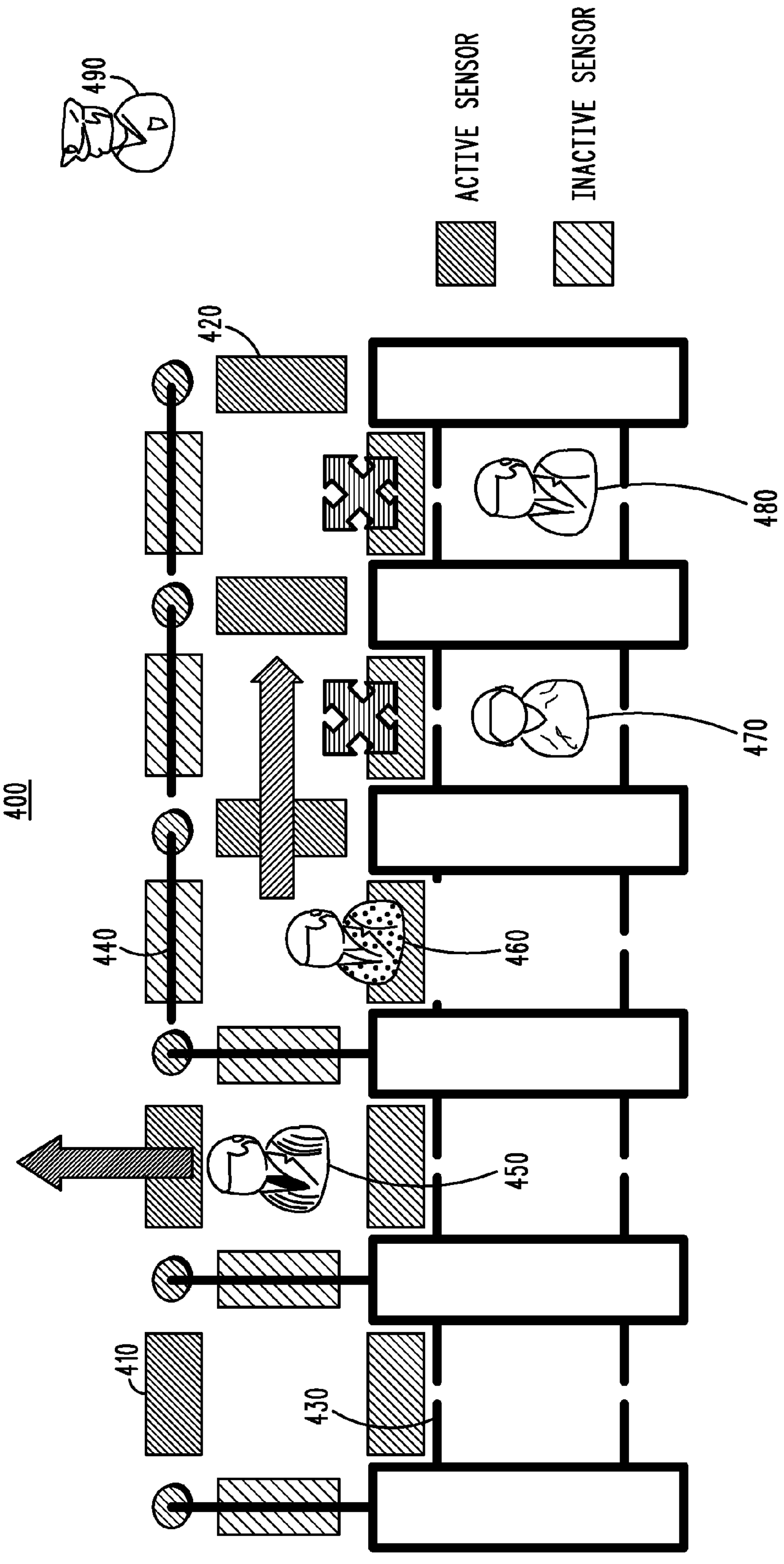
Figure 7:
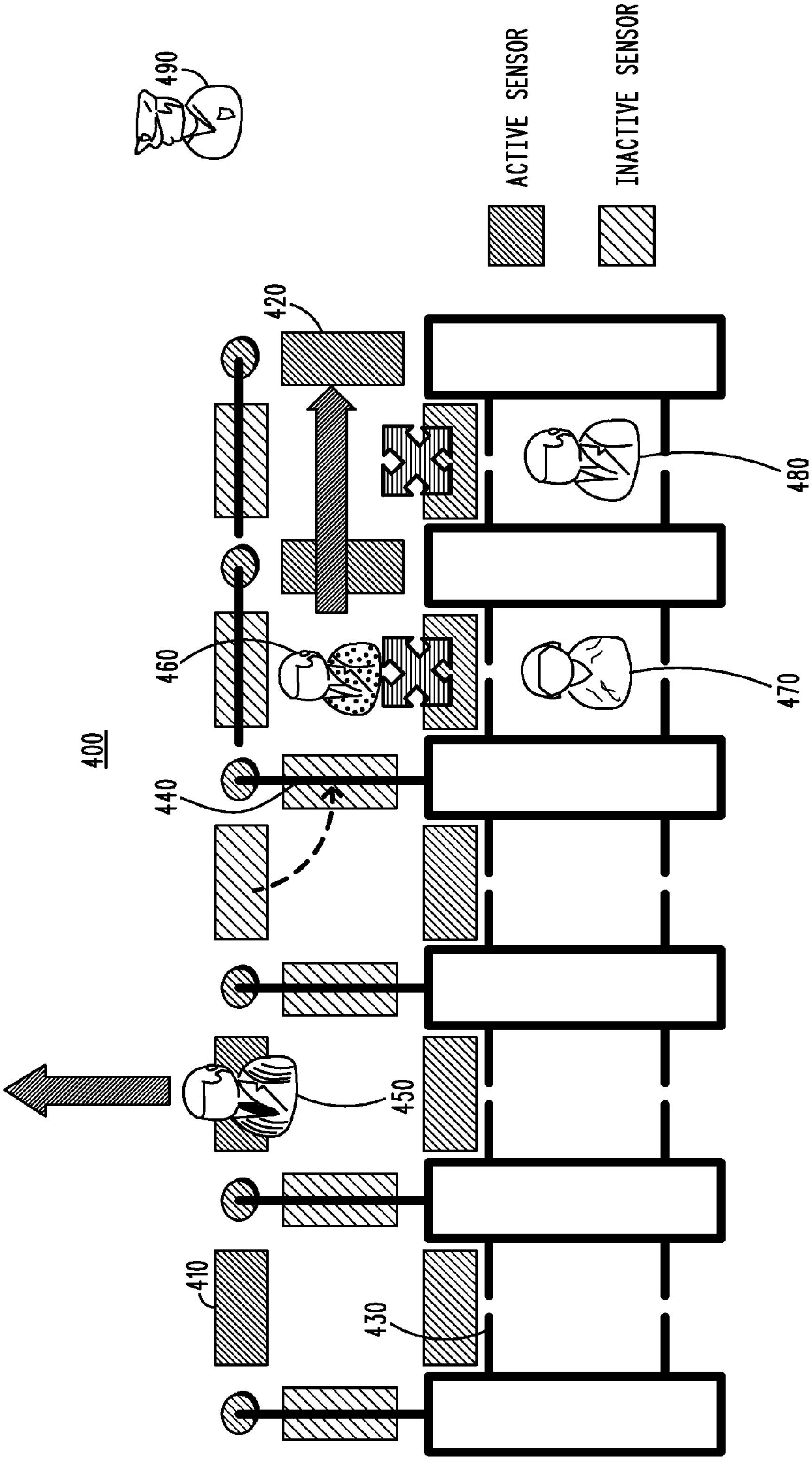
Figure 8:
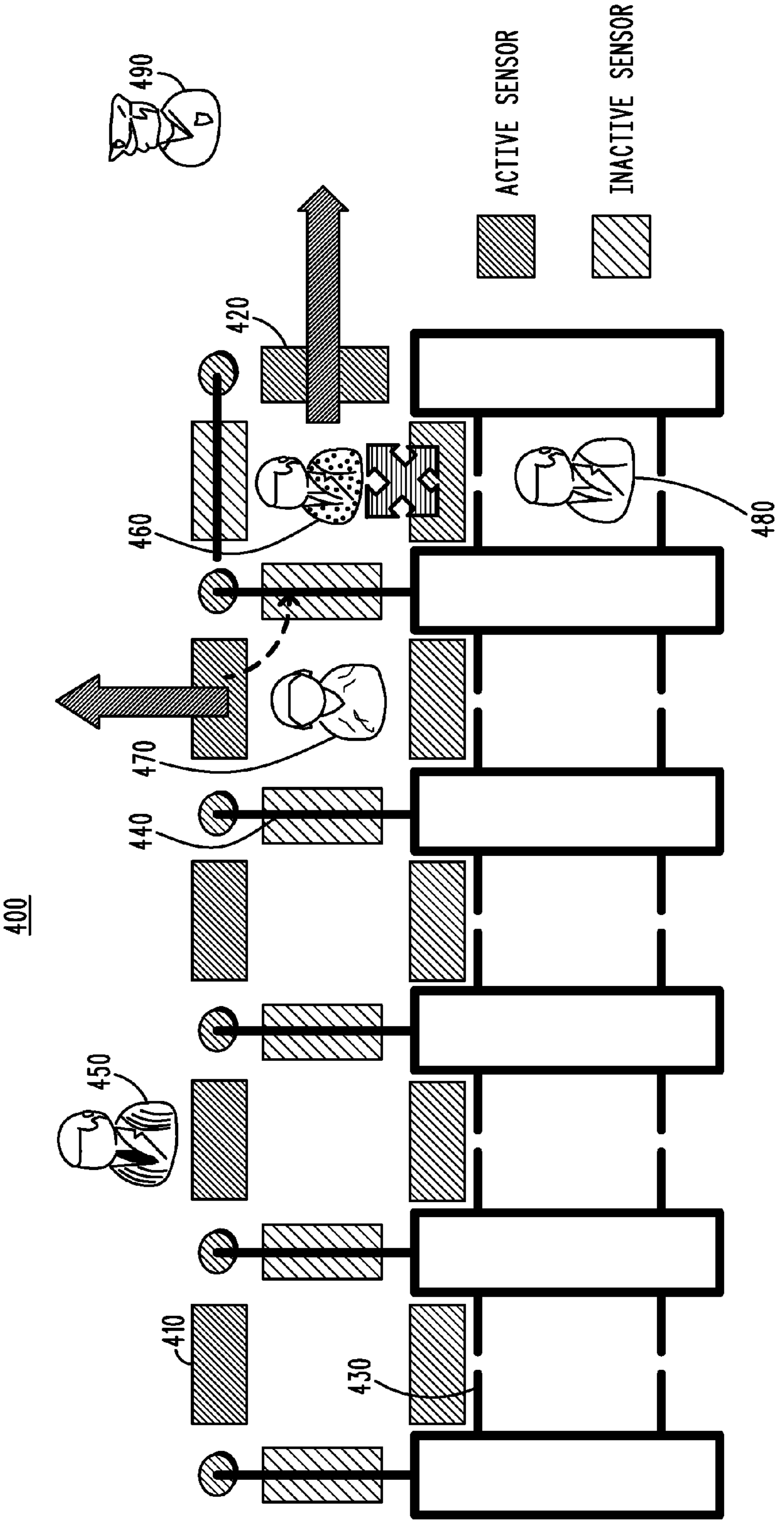

As shown in FIG. 6, non-authorized individual 460 begins to enter the channel. Individuals 470 and 480 have been authorized but the sliding gates 430 remain closed to maintain the integrity of the channel. As shown in FIG. 7, as the non-authorized individual 460 moves along the channel passing over sensors 420 automatically closes swinging gates 440 behind preventing any attempt to return through the system. Individuals 470 and 480 remain in clearing areas to the right are delayed until such time that the non-authorized individual 460 has past their gate. As shown in FIG. 8, individual 470 is allowed to pass through the sliding gate 430 once the sensor 420 indicates that the non-authorized individual has passed individual's 470 gate and that swinging gate 440 has swung counter-clockwise and has return to its original position.

Figure 9:
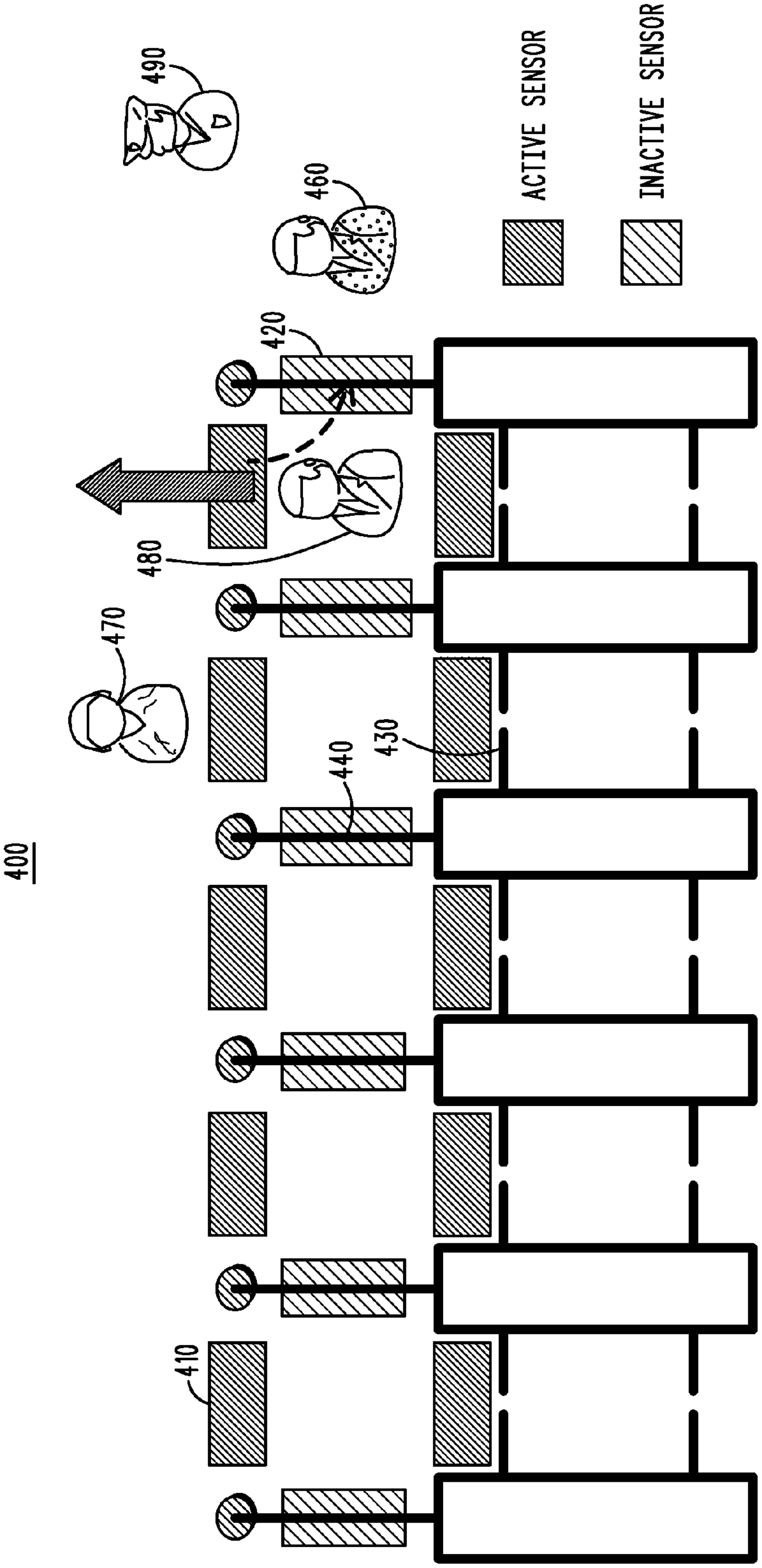

As shown in FIG. 9, once the non-authorized individual 460 passes the last gate, the lass swinging gate 440 swings closed and the passenger is now in an secured manual screening area. The non-authorized individual 460 may no longer access the clearance area or gates of the automated gate controlled secured environment 400. In this secured area, the non-authorized individual 460 may be detained if necessary, or manually authorized.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the gate controller module 250 in FIG. 2 each processing the content in various possible ways. It does not necessarily need to be one system used by all end users. Accordingly, the appended claims and their legal equivalents should only define the disclosure, rather than any specific examples given.

I claim:

1. A method for controlling access to a secured area using an automated gate controlled secured environment, comprising:

receiving an indication that an individual attempting to pass through a clearance area has not been authorized to pass through the clearance area;

automatically moving two or more gates to create a channel for the non-authorized individual to be directed to a manual screening area, wherein one or more gates behind the non-authorized individual close so that the non-authorized individual cannot exit the clearance area once the non-authorized individual has entered the clearance area without being authorized or being sent to the manual screening area;

determining if the non-authorized individual has passed one or more sensors linked to at least one of the two or more gates which create the channel, wherein if the non-authorized individual has been determined to have passed the one or more sensors linked to at least one of the two or more gates which create the channel, then moving at least one of the two or more gates linked to at least one of the sensors located behind the non-authorized individual to enable other authorized individuals to pass through the clearance area while maintaining the channel created to the manual screening area; and preventing the non-authorized individual from gaining access to the automated gate controlled secured environment once the non-authorized individual reaches the manual screening area and preventing other individuals from being authorized from the clearance area until the non-authorized individual has passed at least one of the sensors, wherein the sensors are one of an inactive state and an active state, one or more of the sensors be placed in the active state upon receiving the indication that an individual attempting to pass through a clearance area has not been authorized to pass through the clearance area.

2. The method of claim 1, wherein the gates are one of swinging, sliding, lifting and rising.

3. The method of claim 1, wherein the sensors sense at least one of an individual's presence and movement.

4. The method of claim 1, further comprising:

sensing a position of the gates.

5. The method of claim 1, wherein automated gate controlled secured environment is used to gain access to one of an event, a building, a concert, a political event, a sporting event, an amusement park, an airport, a train station, public area, a country boarder area, a passport clearance area, a travel arrival area, and a travel departure area.

6. An automated gate controlled secured environment system that controls access to a secured area, comprising:

two or more gates;

one or more sensors; and a gate controller module that receives an indication that an individual attempting to pass through a clearance area has not been authorized to pass through the clearance area, automatically moves two or more gates to create a channel for the non-authorized individual to be directed to a manual screening area, determines if the non-authorized individual has passed one or more of the one or more sensors linked to at least one of the two or more gates which create the channel, wherein if the gate controller module determines that the non-authorized individual has passed one or more of the one or more sensors linked to at least one of the two or more gates which create the channel, then the gate controller module moves at least one of the or more gates linked to at least one of the sensors located behind the non-authorized individual to enable other authorized individuals to pass through the clearance area while maintaining the channel created to the manual screening area, prevents the non-authorized individual from gaining access to the automated gate controlled secured environment system once the non-authorized individual reaches the manual screening area and prevents other individuals from being authorized from the clearance area until the non-authorized individual has passed at least one of the sensors, wherein the sensors are one of an inactive state and an active state, one or more of the sensors be placed in the active state upon receiving the indication that an individual attempting to pass through a clearance area has not been authorized to pass through the clearance area, and wherein one or more gates behind the non-authorized individual close so that the non-authorized individual cannot exit the clearance area once the non-authorized individual has entered the clearance area without being authorized or being sent to the manual screening area.

7. The automated gate controlled secured environment system of claim 6, wherein the gates are one of swinging, sliding, lifting and rising.

8. The automated gate controlled secured environment system of claim 6, wherein the sensors sense at least one of an individual's presence and movement.

9. The automated gate controlled secured environment system of claim 6, wherein one or more of the one or more sensors sense a position of the one or more gates.

10. The automated gate controlled secured environment system of claim 6, wherein automated gate controlled secured environment system is used to gain access to one of an event, a building, a concert, a political event, a sporting event, an amusement park, an airport, a train station, public area, a country boarder area, a passport clearance area, a travel arrival area, and a travel departure area.

11. A non-transitory computer-readable medium storing instructions for controlling access to a secured area using an automated gate controlled secured environment, the instructions comprising:

receiving an indication that an individual attempting to pass through a clearance area has not been authorized to pass through the clearance area;

automatically moving two or more gates to create a channel for the non-authorized individual to be directed to a manual screening area, wherein one or more gates behind the non-authorized individual close so that the non-authorized individual cannot exit the clearance area once the non-authorized individual has entered the clearance area without being authorized or being sent to the manual screening area;

determining if the non-authorized individual has passed one or more sensors linked to at least one of the two or more gates which create the channel, wherein if the non-authorized individual has been determined to have passed the one or more sensors linked to at least one of the two or more gates which create the channel, then moving at least one of the two or more gates linked to at least one of the sensors located behind the non-authorized individual to enable other authorized individuals to pass through the clearance area while maintaining the channel created to the manual screening area; and preventing the non-authorized individual from gaining access to the automated gate controlled secured environment once the non-authorized individual reaches the manual screening area and preventing other individuals from being authorized from the clearance area until the non-authorized individual has passed at least one of the sensors, wherein the sensors are one of an inactive state and an active state, one or more of the sensors be placed in the active state upon receiving the indication that an individual attempting to pass through a clearance area has not been authorized to pass through the clearance area.

12. The non-transitory computer-readable medium of claim 11, wherein the gates are one of swinging, sliding, lifting and rising.

13. The non-transitory computer-readable medium of claim 11, wherein the sensors sense at least one of an individual's presence and movement.

14. The non-transitory computer-readable medium of claim 11, further comprising:

sensing a position of the gates.

15. The non-transitory computer-readable medium of claim 11, wherein automated gate controlled secured environment is used to gain access to one of an event, a building, a concert, a political event, a sporting event, an amusement park, an airport, a train station, public area, a country boarder area, a passport clearance area, a travel arrival area, and a travel departure area.

* * * * *